(12) United States Patent
Varma

(10) Patent No.: US 6,272,857 B1
(45) Date of Patent: Aug. 14, 2001

(54) SHAPE MEMORY ALLOY ACTUATOR

(75) Inventor: Venugopal K. Varma, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/370,522

(22) Filed: Aug. 6, 1999

(51) Int. Cl.$^7$ .................................................. F01B 29/10
(52) U.S. Cl. ......................................................... 60/527
(58) Field of Search ............................. 60/527, 528, 529

(56) References Cited

U.S. PATENT DOCUMENTS

| | | | |
|---|---|---|---|
| 4,075,847 | * | 2/1978 | Ray ........................................ 60/527 |
| 4,257,231 | * | 3/1981 | Banks ..................................... 60/527 |
| 4,551,974 | * | 11/1985 | Yaeger et al. ......................... 60/527 |
| 4,553,393 | | 11/1985 | Ruoff . |
| 4,700,541 | | 10/1987 | Gabriel et al. . |
| 4,922,718 | * | 5/1990 | Hochstein et al. .................... 60/527 |
| 5,127,228 | * | 7/1992 | Swenson ................................ 60/527 |
| 5,396,769 | | 3/1995 | Brudnicki . |

OTHER PUBLICATIONS

Mahan et al, "Multilayer Thermionic Refrigeration," *Physical Review Letters*, vol. 80, No. 18, May 4, 1998, pp. 4016–4019.

* cited by examiner

*Primary Examiner*—Hoang Nguyen
(74) *Attorney, Agent, or Firm*—Akerman Senterfitt

(57) ABSTRACT

An actuator for cycling between first and second positions includes a first shaped memory alloy (SMA) leg, a second SMA leg. At least one heating/cooling device is thermally connected to at least one of the legs, each heating/cooling device capable of simultaneously heating one leg while cooling the other leg. The heating/cooling devices can include thermoelectric and/or thermoionic elements.

20 Claims, 2 Drawing Sheets

SHAPE MEMORY ALLOY ACTUATOR

STATEMENT REGARDING FEDERALLY SPONSORED RESEARCH AND DEVELOPMENT

This invention was made with government support under contract DE-AC05-96OR22464, awarded by the United States Department of Energy to Lockheed Martin Energy Research Corporation, and the United States Government has certain rights in this invention.

CROSS-REFERENCE TO RELATED APPLICATION

Not Applicable

FIELD OF THE INVENTION

This invention relates to actuators. More specifically, the invention relates to a high repetition actuator having a large force-to-weight ratio with the use of shape memory alloy.

BACKGROUND OF THE INVENTION

Certain metals, often referred to as shape memory alloys, undergo a phase transformation upon a change in temperature. These alloys are characterized by memory of a mechanical configuration imposed upon the alloy during its austenite phase. At a lower temperature, the alloy's martensite phase allows the alloy to be relatively easily deformed into a particular shape. If, when in that particular shape, the alloy is heated to a temperature in which the alloy undergoes a phase transformation from martensite phase to austenite phase, the memory effect of the alloy is manifested by a return to the shape ordinarily imparted upon the alloy in its austenite phase.

Many different types of actuators have been proposed using shape memory alloys. A typical actuator construction is to use thin wires of the shape memory alloy. The actuation is caused by the elongation and contraction of the wires. Also, these actuators typically use resistive methods for heating the alloys and air/water convection methods to cool the alloys.

An example of an actuator using shape memory alloy is found in U.S. Pat. No. 5,396,769 to Brudniki. Brudniki shows two capstans mounted on a shaft which is supported in a framework with each capstan capable of rotating the shaft. Two separate lengths of shape memory wire are wrapped around each capstan to form a winding around that particular capstan. One wire is wrapped in a pre-stretched state and the other is not. When heated, one wire performs work in one direction, and when the other wire is heated the action is reversed.

Another example is found in U.S. Pat. No. 5,127,228 to Swenson. Swenson shows a rotary actuator using shape memory alloy. The actuator is made of two concentric tubular shape memory alloy members torsioned along their longitudinal axis with ends constrained relative to each other. One end of the actuator is constrained while the other is the output. A heater is located inside the inner shape memory alloy member, and a heater is located on the outside of the outer shape memory alloy member. The unconstrained end is caused to rotate between positions by applying current to the appropriate heater.

A mechanical actuator is taught by U.S. Pat. No. 4,553, 393 to Ruoff. The mechanical actuator is constructed using a plurality of shape memory actuator elements in parallel to control the amount of actuating force. The actuating elements may vary in stiffness according to a binary relationship. The cooling time of the actuator elements may be employing Peltier junction cooling assemblies in the actuator.

Still another actuator using shape memory alloy is taught in U.S. Pat. No. 4,700,541 to Gabriel et al. Gabriel shows an electrically controlled shape memory alloy actuator made of a shape memory wire which is torsioned along its longitudinal axis and with its ends constrained against movement. A lever is attached to a wire at a desired point other than at a wire end. Electrical connections spaced along the wire define different sections along the wire. The wire and attached control element are made to rotate by selectively apply voltages to the different sections of the wire to heat the individual sections.

A problem, however, with most types of these actuators is that the frequency of operation is not very high. The frequency being the amount of cycles over a given time that the actuator performs, and a cycle defined as the total of the movement of the actuator from the initial state to an intermediary state and back to the first state. One cause for the low frequency of operation is the length of time required to cool the memory shape alloy.

Another problem associated with these types of actuators is that geometries other than thin wires of the shape memory alloy cause the electrical resistance of the shape memory alloy to be very low. As such, to heat the alloy in such shapes using resistive heating requires a large current. Thus, unless an external heater is employed, a large power system would likely be needed to supply the actuator with enough current to heat the alloy sufficiently to cause a phase transformation.

BRIEF SUMMARY OF THE INVENTION

It is therefore an object of the invention to provide an actuator using plates of shape memory alloy and a method of making same that can produce a very high frequency of operation.

It is another object of the invention to provide an actuator using shape memory alloy and method of making the same that has a large weight to force ratio.

It is yet another object of the invention to provide an actuator using shape memory alloy and method of making the same that uses a thermoelectric/thermoionic material to provide heating and cooling to the shape memory alloy. Also, the thermoelectric/thermoionic material is preferably capable of being operated using battery-supplied current.

It is a further object of the invention to provide an actuator using shape memory alloy and method of making the same that can be effectively used in mesoscopic systems with mesoscopic systems being approximately less than or equal to 5 CM.

It is still another object of the invention to provide an actuator using shape memory alloy and method of making the same that can be embedded within the structure of a mechanism, which enables an elimination of power transmission requirements.

These and other objects of the invention are achieved by the subject device which comprises a first leg, a second leg, and a heating/cooling device. The first and second legs are formed from shape memory alloy material and have respective fixed and opposing free ends. The fixed ends are fixed by a base. The second leg opposes the first leg and is connected to the first leg. The heating/cooling device is preferably disposed between the first and second legs and is thermally connected to the first and second legs.

The preferred heating/cooling device is a thermoelectric element. The thermoelectric element heats the first leg and cools the second leg upon application of a current in a first direction through the thermoelectric element. Also, the thermoelectric element cools the first leg and heats the second leg upon application of the current through the thermoelectric element in a second direction opposite the first direction. The first leg is trained in its austenite phase in the first position, and the second is trained in its austenite phase in the second position. The thermoelectric element can also be disposed adjacent respective stationary portions of the first and second legs. A method of manufacture and use of the actuator is also disclosed.

In a second embodiment of the invention, the actuator comprises legs, a connector, a spring, and a heating/cooling device. The legs are formed from shape memory alloy material and adapted to be connected to a base. The connector connects the legs and is connected to the spring. The spring is also adapted to be connected to the base. The heating/cooling device is thermally connected to each of the legs and has two modes of operation. The heating/cooling device in a first mode causes the legs to expand to a first position, the heating/cooling device in a second mode causes the legs to contract to a second position. By alternating the modes of operation, the actuator can be cycled between the first and second positions.

In a third embodiment of the invention, the actuator comprises first and second elements, a separator, and a heating cooling device. The elements are formed from shape memory alloy metal with each of the elements cyclable between first and second shapes. The separator is disposed between the first and second elements. The heating/cooling device is thermally connected to the elements and has two modes of operation. The heating/cooling device in a first mode heats the first element and cools the second element. The heating/cooling device in a second mode cools the first element and heats the second element.

In a fourth embodiment of the invention, the actuator comprises an outer tube, an inner tube, and a heating/cooling device. The inner tube is disposed within the outer tube, and the tubes are formed from shape memory alloy metal. Also, distal ends of the tubes are connected. The heating/cooling device is disposed between the inner and outer tubes and is thermally connected to the tubes. Also, the heating/cooling device has two modes of operation. The heating/cooling device in a first mode heats the inner tube and cools the outer tube. The heating/cooling device in a second mode cools the inner tube and heats the outer tube.

BRIEF DESCRIPTION OF THE DRAWINGS

There are shown in the drawings embodiments of the invention that are presently preferred, it being understood, however, that the invention is not limited to the precise arrangements and instrumentalities shown, wherein.

DETAILED DESCRIPTION OF THE INVENTION

Figure 1:
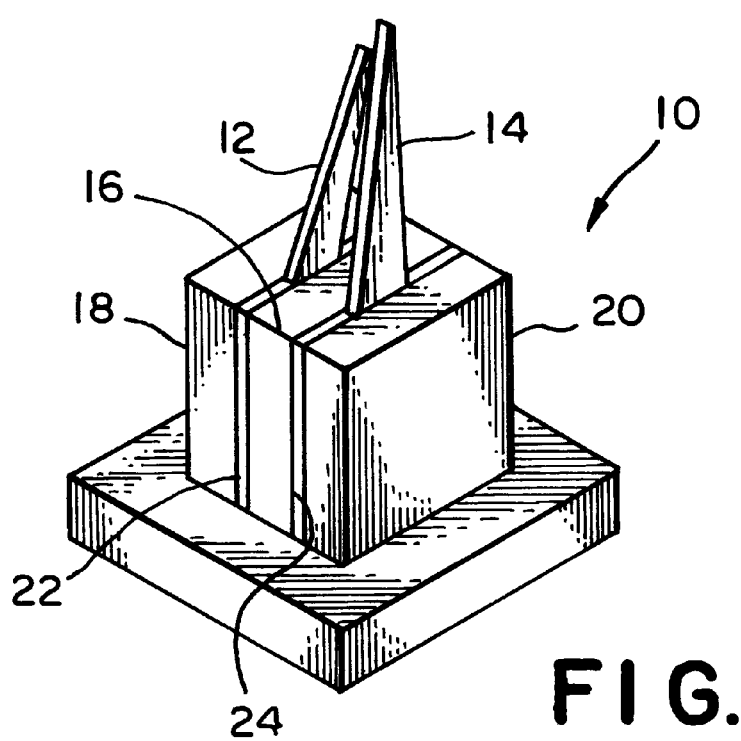
FIG. 1 is a perspective of an actuator according to a first embodiment of the invention.
Figure 2A:
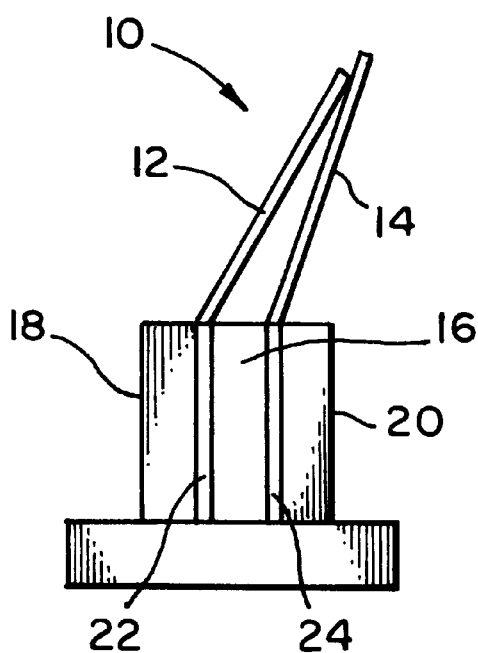
FIG. 2A is a side elevation of the actuator shown in FIG. 1 in a first position.
Figure 2B:
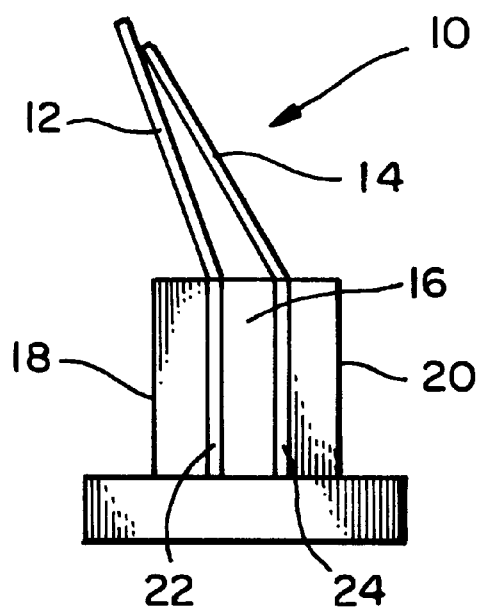
FIG. 2B is a side elevation of the actuator shown in FIG. 1 in a second position.

Referring to FIGS. 1 and 2, an actuator using shape memory alloy, according to the present invention, is illustrated. The actuator 10 comprises a first leg 12, a second leg 14 opposing the first leg 12, and a heating/cooling device 16. The first and second legs 12, 14 are constructed from shape memory alloy.

As previously stated, shape memory alloys are characterized by their ability to resume their shape which they had prior to a deformation upon heating to a temperature above their respective austenite temperature. Illustrative examples of these alloys include Cu—Zn—Al alloys, Cu—Al—Ni alloys, and Ni—Ti alloys. Shape memory alloys have varying characteristics including the transition temperature, the ratio of strength between one phase (martensite) and the second phase (austenite), and the modulus of elasticity as examples.

Depending upon a particular application, the requirements of the shape memory alloy may vary. For example, use of shape memory alloy as an aileron for a plane may require high strength whereas use in a micro-robot may require less strength. Also, because of the temperature in which the shape memory alloy is used, a shape memory alloy with a particular transition temperature may be required. These examples are illustrative of the type of factors which should be considered when choosing a particular shape memory alloy, and are typical of the type of considerations typically undertaken during the selection of a material for a particular application. Although this invention is not limited to a particular type of shape memory alloy, the presently preferred shape memory alloy is a Ni—Ti (nitinol) alloy from Shape Memory Alloy Application Inc. of California.

Although, the legs 12, 14 can take the form of any shape, the presently preferred legs 12, 14 are triangular. A triangular geometry is advantageous so as to have constant stress along the length of the legs 12, 14 which are not in contact with the heating/cooling device 16. This geometry thus allows for maximization of the stored strain energy per weight in each leg 12, 14.

The heating/cooling device 16 simultaneously provides heating and cooling to the legs 12, 14. Preferably, the heating/cooling device 16 heats one leg 12 or 14 and cools the other leg 14 or 12 at the same time. Also, the heating/cooling device 16 preferably can alternately heat and then cool a particular leg 12, 14.

Many heating/cooling devices 16 are capable of simultaneously providing both heating and cooling, for example a refrigerator, and the invention is not limited as to any particular heating/cooling device 16. Also, the invention is not limited to those heating/cooling devices 16 that are capable of alternately providing heating and then cooling to a particular element. One illustrative example is a refrigerator having dual loops in which the heating coils of the first loop is positioned adjacent to the cooling coils of the second loop and vice-versa. By alternately operating the coils, heating and then cooling of a particular element can be achieved.

The heating/cooling device 16, however, is most preferably capable of quickly alternating between heating and cooling. Any heating/cooling device 16 capable of quickly alternating between heating and cooling is acceptable for use with this invention. One example of a heating/cooling device 16 so capable is a thermoelectric. A thermoelectric uses the Peltier effect whereby heat is liberated or absorbed at a junction when current passes from one metal to another. Upon a change in direction of the current, the effect is reversed.

Similar to that of the shape memory alloy, many different types of thermoelectrics;are available which have differing characteristics. The thermoelectric to be used should be chosen so as to match the characteristics of the shape memory alloy. For example, a shape memory alloy will have a particular transition temperature; and therefore, the thermoelectric should be capable of raising and lowering the temperature of the shape memory alloy through the transition temperature. The presently preferred thermoelectric is constructed from $Bi_2Te_3$. This particular material has an operating temperature of approximately 0–1200° C.

Another heating/cooling device 16 capable of quickly alternating between heating and cooling of a particular element is a thermionic device. Thermionic refrigeration is described by G. D. Manhan and L. M. Woods, "Multilayer Thermionic Refrigeration," in *Physical Review* Letters, Vol. 80, Number 18 4016–4019 (The American Physical Society 1998) and is incorporated by reference herein. Cooling is obtained in thermoionic emission after thermally excited electrons escape over a barrier, with the barrier typically being a semiconductor. Such a device has an expected efficiency somewhere between one and two, which is similar to Freon-based refrigeration.

The invention is not limited as to the location of the heating/cooling device 16 with regard to the legs 12, 14 so long as the heating/cooling device 16 can provide the heating and/or cooling to the legs 12, 14. For example, the heating/cooling device 16 can be connected to the legs 12, 14 via a thermoconductor, for example a metal such as copper.

However, the heating/cooling device 16 is preferably located adjacent to the legs 12, 14 to decrease the time of thermal transfer between the heating/cooling device 16 and the legs 12, 14. Most preferably, the heating/cooling device 16 is disposed between the legs 12, 14. In this position, each portion, one portion providing the heating/cooling and a second portion providing the cooling/heating, of the heating/cooling device 16 can-be positioned adjacent a respective leg 12, 14.

Any connection between the heating/cooling device 16 and the legs 12, 14 is acceptable so long as the connection can transfer thermal energy to and from the heating/cooling device 16 from and to the legs 12, 14. Such connections are well known in the art and all are acceptable with this invention. Preferably, the connection is capable of rapidly transferring thermal energy. Also, the connection preferably does not readily absorb thermal energy, which would decrease the time of thermal transfer. In a preferred embodiment, thermal grease and pressure connect the heating/cooling device 16 to the legs 12, 14.

In the preferred embodiment, in which a fragile heating/cooling device 16 is used, the heating/cooling device 16 is placed where large deformation does not occur. For example, a thermoelectric heating/cooling device 16 is a semiconductor, and as such is likely to be damaged under deformation. In a most preferred embodiment, the heating/cooling device 16 is disposed at the base 22, 24 of the legs 12, 14. The movement of the legs 12, 14 at their base 22, 24 is substantially less than the movement at their distal ends, and therefore the heating/cooling device 16 will undergo less deformation at the base of the legs 12, 14.

In use, the two legs 12, 14 are trained such that their shapes in their austenite phase are antagonistic to each other. When the heating/cooling device 16 heats one leg 12 or 14 while cooling the other leg 14 or 12. The heated leg 12 or 14 goes to the austenite phase while the cold leg 14 or 12 assumes the martensite phase. Because the austenite leg 12 or 14 is stronger than the martensite leg 14 or 12 (typically by a factor of 6–10 using Ti—Ni alloy), the austentite leg 12 or 14 pushes the martensite leg 14 or 12 in the process of returning to its parent (i.e., trained) state. By reversing the heating/cooling, the actuator 10 can be made to move in the opposite direction. When a thermoelectric is used, the heating/cooling is reversed by changing the direction of current applied to the thermoelectric.

A thermoelectric's heating rate is larger than its cooling rate by the amount of electrical power input ($I^2R$). Thus, to maintain the temperature of the actuator 10 during continuous operation, additional cooling thermoelectric devices 18, 20 are preferably included. These additional thermoelectric devices are not limited as to a particular position in the actuator 10; however, the additional thermoelectric devices 18, 20 are preferably positioned adjacent respective legs 12, 14 such that one thermoelectric device 16 is positioned between the legs 12, 14 and the additional thermoelectric devices 18, 20 are positioned opposite the middle thermoelectric device 16. In this manner, the leg 12 or 14 being heated is heated from only the middle thermoelectric 16, whereas the leg 14 or 12 being cooled is cooled from the middle 16 and an outer thermoelectric 20 or 18. In this manner, the heating and cooling rates of the legs 12 and 14 can be matched.

Figure 3:
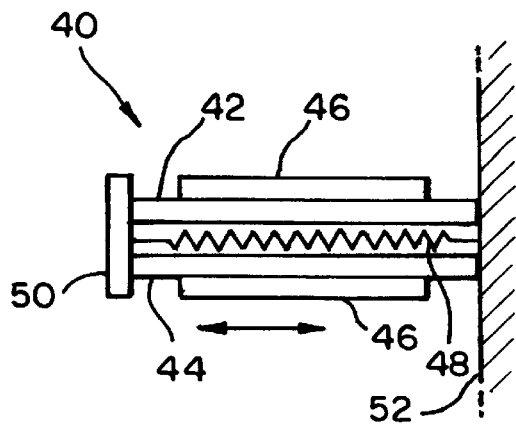
FIG. 3 is a side elevation of an actuator according to a second embodiment of the invention.

A second embodiment of an actuator 40 is illustrated in FIG. 3. The linear actuator 40 is comprised of at least two legs 42, 44, at least two heating/cooling devices 46, at least, one spring 48, and a connector 50. The legs 42, 44 are constructed from shape memory alloy. The heating/cooling devices 46 are respectively disposed adjacent the legs 42, 44 to provide heating and/or cooling to the legs 42, 44. The connector 50 is attached to the legs 42, 44 and the spring 48. The actuator 40 is preferably attached to a base 52 via the legs 42, 44 and spring 48.

In use, the heating/cooling device 46 applies heat to the legs 42, 44 which raises the temperature of the legs 42, 44 past the transition critical temperature of the shape memory alloy.

The legs 42, 44 are trained such that when heat is applied, the legs 42, 44 contract, which compress the spring 48 in the middle. When the legs 42, 44 are cooled, the shape memory alloy is transformed back to its martensite phase, and the spring pushes the legs 42, 44 back to their original shape. In this manner two-way actuation is obtained.

In a presently preferred embodiment, the heating/cooling devices 46 is a thermoelectric device. When using a thermoelectric device in this application, the thermoelectric is preferably thermally connected but not physically connected to the legs 42, 44. In this manner, the thermoelectric elements can heat/cool the legs 42, 44, and by not being physically attached, the extension and contraction of the legs 42, 44 does not damage the thermoelectric elements. As such, the legs 42, 44 can slide with respect to the thermoelectric device. Thermal grease is presently preferred to connect the thermoelectric device to the legs 42, 44.

Figure 4:
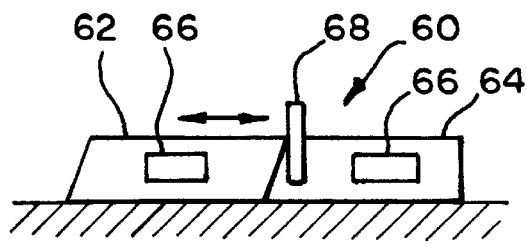
FIG. 4 is a side elevation of an actuator according to a third embodiment of the invention.

A third embodiment of an actuator according to the invention is illustrated in FIG. 4. The planar shear actuator 60 is comprised of opposing elements 62, 64 constructed of shape memory alloy and separator 68. The two elements 62, 64 are placed as shown in FIG. 4, and are trained to conform to their shape in their austenite phase. When, for example, the left element 62 is heated, the left element 62 changes to its austentite phase thereby changing shape and pushing against the separator 68. The separator 68 transfers this pushing force to the right element 64, which deforms to a 'square' shape. Alternatively, when the right element 64 is heated, it pushes the left element 62 to a 'square' shape (not shown). It should be noted, however, that the shapes in which the elements can be formed are not limited to a 'square' shape.

In a presently preferred embodiment, the heating/cooling devices 66 is a thermoelectric device. When using a thermoelectric device in this application, the thermoelectric is preferably thermally connected but not physically connected to the elements 62, 64. In this manner, the thermoelectric elements can heat/cool the elements 62, 64, and by not being physically attached, the motion of the elements 62, 64 does not damage the thermoelectric elements. As such, the elements 62, 64 can slide with respect to the thermoelectric device.

Figure 5:
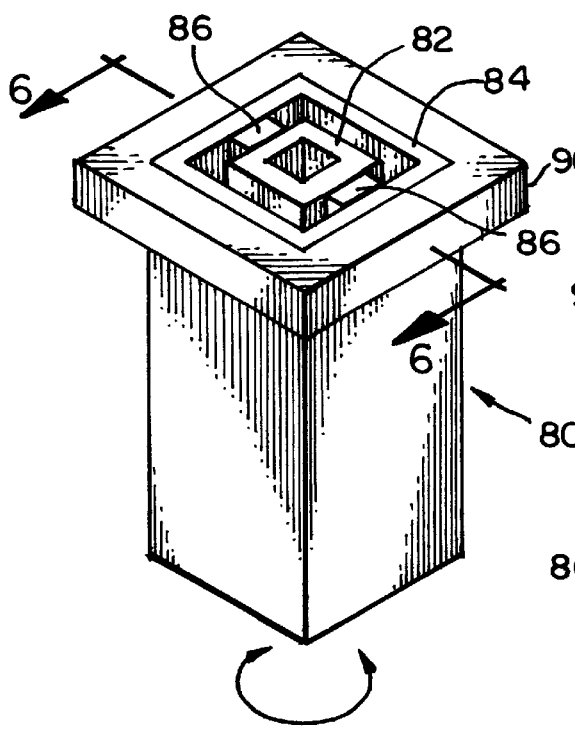
FIG. 5 is a perspective of an actuator according to a fourth embodiment of the invention.
Figure 6:
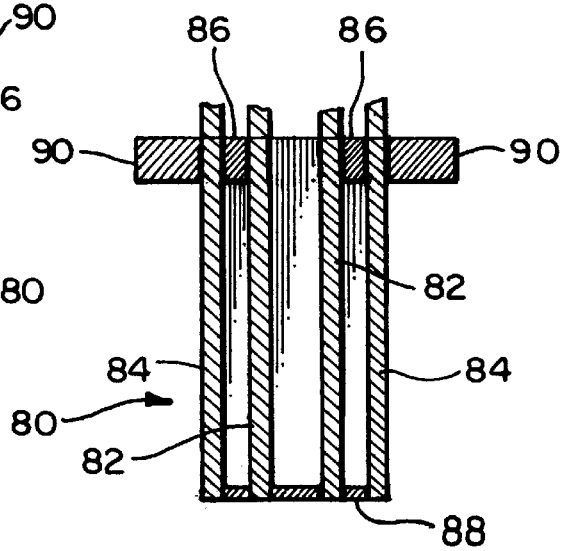
FIG. 6 is a cross-section taken along line 6—6 of FIG. 5.

A fourth embodiment of an actuator according to the invention is illustrated in FIGS. 5 and 6. The torsional actuator 80 is comprised of inner and outer tubes 82, 84, with the inner tube 82 being disposed within the outer tube 84, and a heating/cooling devices 86 disposed between the inner and outer tubes 82, 84. One distal end 88 of both the tubes 82, 84 are then physically connected.

The tubes 82, 84 are constructed from shape memory alloy. When the outer tube 84 is heated, the heating/cooling device 86 cools the inner tube 82 and vice versa. Since the strength of shape memory alloy in austenite phase is higher than at martensite phase, the tube 82 or 84 in austenite phase will twist the tube 84 or 82 in martensite phase causing rotational actuation at the distal end 88. By reversing the application of heat and cold to the tubes 82, 84, the tubes 82, 84 rotate in a counter direction to that of the first direction of rotation.

The presently preferred tubes 82 and 84 have differing thicknesses, so that both clockwise and counter-clockwise rotations exert the same torques. Preferably, the inner tube 82 will be thicker than the outer tube 84 because the inner tube 82 will have a smaller cross-sectional dimension.

In a presently preferred embodiment, the heating/cooling devices 86 is a thermoelectric device. When using a thermoelectric device in this application, the thermoelectric is preferably connected to a portion of the tubes 82, 84 that does not rotate. In this manner, the rotation and counter rotation of the tubes 82, 84 does not damage the thermoelectric elements. As such, the tubes 82, 84 preferably slide with respect to the thermoelectric device. The thermoelectric devices 86 are preferably positioned adjacent a fixture 90 holding portions of the tubes 82, 84 stationary.

Although, the tubes 82, 84 can have any cross-sectional shape, including circular, the presently preferred shape of the tubes 82, 84 are approximately square. The square shape is advantageous in facilitating the connection of the presently preferred thermoelectric elements to the tubes 82, 84 as commercial thermoelectric elements typically have a square cross-section.

EXAMPLE OF FIRST EMBODIMENT

An actuator 10 was constructed using the configuration shown in FIG. 1. Each leg 12, 14 was constructed using a Ni—Ti alloy shape memory alloy. Each leg 12, 14 has a respective free end portion 12a, 14a, which was unconstrained and thus able to move, and a respective stationary portion 12b, 14b. The distal ends of the free end portions 12a, 14a were contacting each other but not connected. The free end portion of each leg 12a, 14a had dimensions of 7.5 mm in length, 2 mm in width, and 0.5 mm in thickness. The heating/cooling device 16 was a model 6300/018/018C thermoelectric from ITI Ferrotec. The thermoelectric had dimensions of 6.1 mm in length and width, and 2.0 mm in thickness.

Application of a current to the thermoelectric generated the phase transformation in one of the legs 12 or 14 as it was heated to above its transition temperature. This phase transformation generated a force greater than 3 Newtons at the tip of the legs 12, 14. This particular actuator 10 changed phase in 0.4 seconds; and thus, an operating rate of 75 cycles per minute (cpm) was produced.

It should be understood that the examples and embodiments described herein are for illustrative purposes only and that various modifications or changes in light thereof will be suggested to persons skilled in the art and are to be included within the spirit and purview of this application.

The invention can take other specific forms without departing from the spirit or essential attributes thereof for an indication of the scope of the invention.

What is claimed is:

1. An actuator for cycling between first and second positions, comprising:

first and second legs formed from shape memory alloy material and a base, each said leg having a fixed end fixed when attached to the base and a free end, said legs trained to shapes in opposition to one another in their respective austentite phases; and, at least one heating/cooling device thermally connected to at least one of said legs, each of said heating/cooling devices capable of simultaneously heating one of said legs while cooling the other of said legs.

2. An actuator according to claim 1, wherein said at least one heating/cooling device includes at least one thermoionic element.

3. An actuator according to claim 1, wherein said at least one heating/cooling device includes at least one thermoelectric element.

4. An actuator according to claim 3, wherein said thermoelectric elements are disposed adjacent to respective stationary portions of said first and second legs.

5. An actuator according to claim 4, wherein said respective stationary portions are adjacent said respective fixed ends.

6. An actuator according to claim 1, wherein said heating/cooling devices have two modes of operation, said heating/cooling devices in a first mode heating said first leg and cooling said second leg and said heating/cooling devices in a second mode cooling said first leg and heating said second leg wherein in the second position, beating of said first leg to its austenite phase returns said first leg to the first position, said first leg returning to the first position deforming said second leg to the first position, and in the first position, heating of said second leg to its austenite phase returns said second leg to the second position, said second leg returning to said second position deforming said first leg to the second position.

7. An actuator for cycling between first and second positions, comprising:

a base;

a first leg, said first leg formed from shape memory alloy and trained in its austenite phase in the first position;

a second leg, said second leg formed from shape memory alloy and trained in its austenite phase in the second position, said first and second legs each having a fixed end fixed when attached to the base and a free end, said second leg opposing said first leg; and, at least one thermoelectric element thermally connected to at least one of said first and second legs, wherein upon application of current in a first set of directions through said thermoelectric elements, said thermoelectric elements heating said first leg and cooling said second leg, heating of said first leg to its austenite phase returns said first leg to the first position, said first leg returning to the first position deforming said second leg to the first position, upon application of current in an opposite set of directions from said first direction through said thermoelectric elements, said thermoelectric elements cooling said first leg and heating said second leg, heating of said second leg to its austenite phase returns said second leg to the second position, said second leg returning to said second position deforming said first leg to the second position.

8. A method of manufacturing an actuator for cycling between first and second positions, comprising the steps of:

training a first leg of shape memory alloy in its austenite phase in the first position;

training a second leg of shape memory alloy in its austenite phase in the second position, said legs trained to shapes in opposition to one another in their respective austentite phases;

disposing at least one thermoelectric element in thermal connection with at least one of said first and second legs;

contacting said first leg to said second leg; and, fixing respective fixed ends of the first and second legs to a base.

9. A method of cycling a shape memory alloy actuator between first and second positions, said actuator having first and second legs and at least one thermoelectric element disposed in thermal connection with at least one of said first and second legs, comprising the steps of alternating:

applying current in a first set of directions to at least one of said thermoelectric elements thereby heating said first leg in the second position to its austenite phase and cooling said second leg to its martensite phase, heating of the first leg returning the first leg to the first position, the first leg returning to the first position deforming the second leg to the first position, and;

applying current in a second set of directions opposing the first directions to at least one of said thermoelectric elements thereby heating the second leg in the first position to its austenite phase and cooling the first leg to its martensite phase, heating of the second leg returning the second leg to the second position, the second leg returning to the second position deforming the first leg to the second position.

10. An actuator for cycling between first and second positions, comprising:

legs formed from shape memory alloy material;

connector connecting said legs;

a spring attached to said connector; and, heating/cooling devices thermally connected to at least one of said legs, said heating/cooling devices each capable of simultaneously heating one of said legs while cooling the other of said legs.

11. An actuator according to claim 10, wherein said heating/cooling devices includes at least one thermoionic element.

12. An actuator according to claim 10, wherein said heating/cooling devices includes at least one thermoelectric element.

13. An actuator for cycling between first and second positions, comprising:

first and second elements formed from shape memory alloy metal, each of said first and second elements cyclable between first and second shapes;

a separator disposed between said first and second elements; and, at least one heating/cooling device thermally connected to at least one of said elements, said heating/cooling devices each capable of simultaneously heating one of said legs while cooling the other of said legs.

14. An actuator according to claim 13, wherein said heating/cooling devices includes at least one thermoionic element.

15. An actuator according to claim 13, wherein said heating/cooling devices includes at least one thermoelectric element.

16. An actuator for cycling between first and second positions, comprising:

an outer tube;

an inner tube disposed within said outer tube, said tubes formed from shape memory alloy metal, distal ends of said tubes connected; and, at least one heating/cooling device disposed in thermal contact with at least one of said inner and outer tubes, said heating/cooling devices each capable of simultaneously heating one of said tubes while cooling the other of said tubes.

17. An actuator according to claim 16, wherein said heating/cooling devices includes at least one thermoionic element.

18. An actuator according to claim 16, wherein said heating/cooling devices includes at least one thermoelectric element.

19. An actuator according to claim 16, wherein one of said tubes has its austentite state without torsional displacement with respect to a longitudinal axis of said tubes in said first position and said other tube has its austentite phase without torsional displacement with respect to said longitudinal axis in said second position, whereby when one of said tubes is in its austentite phase, said other tube is in torsion.

20. An actuator according to claim 16, wherein said tubes each have substantially square cross sectional areas.

* * * * *